Patented May 19, 1925.

1,538,261

UNITED STATES PATENT OFFICE.

MIKE N. TERPINAS, OF FRANKFORT, INDIANA.

HAT-BLEACHING COMPOSITION.

No Drawing.   Application filed September 1, 1923.   Serial No. 660,644.

*To all whom it may concern:*

Be it known that I, MIKE N. TERPINAS, a citizen of the United States, and a resident of Frankfort, county of Clinton, and State of Indiana, have invented a certain new and useful Hat-Bleaching Composition; and I do hereby declare that the following is a full, clear, and exact description thereof.

This invention relates to a hat bleaching composition which is particularly fitted to bleaching straw hats and panama hats. The composition may be put up in any desired form and usually is in liquid or paste form as will more particularly appear hereinafter.

The chief object of the invention is to produce a bleaching composition which is adapted to bleach straw hats and panama hats or articles of similar material to a degree substantially corresponding to the material when new, it being understood that straw hats and panama hats, as well as articles of similar material, are affected by continued exposure to light, and more particularly sun light.

This composition likewise is adapted to renovate said hats or similar material, but its chief purpose is for bleaching to restore the original color and finish.

The chief feature of the invention consists in the use with other materials of gum arabic and zinc oxalate.

The bleaching compound, the approximate proportions of which will be hereinafter more particularly given is prepared as follows: To one gallon of water there is added approximately one pound of gum arabic. This is preferably permitted to stand for about twenty four hours so that the gum arabic is dissolved in the water. To the solution thus formed approximately one and one half pounds of whitening material, such as Spanish white preferably, is added and mixed therein. Thereafter approximately one pound of zinc oxalate is similarly added thereto and stirred therein. Following this there is also added approximately three pounds of sulphur, and preferably white sulphur otherwise known as precipitated sulphur. The order of mixing the various ingredients with the gum arabic solution may be varied as desired, and the proportions herein given may also be varied without departing from the broader features of the invention, although it has been found that these approximate proportions give substantially the best results.

To the foregoing solution containing the whitening, sulphur and zinc oxalate there is added one half pint of alcohol, and this alcohol may be either wood alcohol or denatured alcohol, although preferably the latter is utilized. The alcohol acts as a binder and maintains uniformity in the mixture. To this mixture there may be added a suitable perfume as desired, and this may be rose water or similar material, and the amount may be varied to suit conditions. To the foregoing also may be added one ounce of oil of myrbane which acts as a preservative agent.

The foregoing constitutes the compound in liquid form. If this liquid be permitted to stand and settle and the water content separated therefrom, the resultant product is a paste which has substantially the same bleaching properties as the liquid and which, instead of being applied with a brush, which is the usual practice with liquids, is applied with a moistened sponge or brush.

While the invention has been described in great detail in the foregoing specifications, particularly the amounts of constituents, the same is to be considered illustrative and not restrictive in character, as will appear more fully from the appended claims.

The invention claimed is:

1. A hat bleach compound including gum arabic, whiting, zinc oxalate, sulphur, oil of myrbane, and alcohol.

2. A hat bleach compound including gum arabic, whiting, zinc oxalate, sulphur, and alcohol.

3. A hat bleach compound including approximately one pound of gum arabic, one and one-half pounds of whiting, one pound of zinc oxalate, three pounds of white sulphur, and one half pint of alcohol.

In witness whereof, I have hereunto affixed my signature.

MIKE N. TERPINAS.